(12) United States Patent
Kogan et al.

(10) Patent No.: US 10,073,766 B2
(45) Date of Patent: Sep. 11, 2018

(54) BUILDING SIGNATURES OF APPLICATION FLOWS

(71) Applicant: Hewlett Packard Enterprise Development LP, Houston, TX (US)

(72) Inventors: Olga Kogan, Yehud (IL); Mor Gelberg, Yehud (IL); Ilan Shufer, Tel Aviv (IL); Amit Levin, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 112 days.

(21) Appl. No.: 15/247,045

(22) Filed: Aug. 25, 2016

(65) Prior Publication Data

US 2018/0060222 A1    Mar. 1, 2018

(51) Int. Cl.
*G06F 11/36* (2006.01)
*G06F 8/70* (2018.01)

(52) U.S. Cl.
CPC ............ *G06F 11/3692* (2013.01); *G06F 8/70* (2013.01); *G06F 11/3688* (2013.01)

(58) Field of Classification Search
CPC .... G06F 8/70; G06F 11/3688; G06F 11/3692; G06K 9/64; G06K 2209/03
USPC ........................... 717/124–135; 714/37, 38.1
See application file for complete search history.

(56) References Cited

U.S. PATENT DOCUMENTS

| | | | | |
|---|---|---|---|---|
| 6,546,524 | B1* | 4/2003 | Chankramath | G01R 31/318314 702/121 |
| 9,672,138 | B1* | 6/2017 | Pitera | G06F 11/3664 |
| 2008/0127095 | A1* | 5/2008 | Brennan | G06F 11/3664 717/124 |
| 2011/0123973 | A1* | 5/2011 | Singh | G06F 11/3668 434/322 |
| 2011/0131551 | A1* | 6/2011 | Amichai | G06F 11/3668 717/125 |
| 2011/0214107 | A1* | 9/2011 | Barmeir | G06F 11/3684 717/125 |
| 2011/0231823 | A1* | 9/2011 | Fryc | G06F 11/3688 717/125 |
| 2011/0314343 | A1* | 12/2011 | Hoke | G06F 11/3672 714/45 |
| 2013/0014085 | A1* | 1/2013 | Brennan | G06F 11/3664 717/125 |

(Continued)

FOREIGN PATENT DOCUMENTS

WO  WO-2017/095362 A1  6/2017
WO  WO-2017/123203 A1  7/2017

OTHER PUBLICATIONS

"Depicted (test instance)", Retrieved from Internet on Mar. 16, 2018, p. 1-2. <https://web.archive.org/web/20141223002816/https://dpxdt-test.appspot.com/>.

(Continued)

*Primary Examiner* — Qing Chen (57) ABSTRACT

An example device in accordance with an aspect of the present disclosure includes a screen identification engine to identify a screen(s) of a test run, an element identification engine to selectively identify an element(s) among available elements of the screen(s), and a signature building engine to build a signature corresponding to the test run. The signature incorporates the screen(s) and element(s) to capture an application flow of the test run, while excluding available elements that do not correspond to the application flow.

20 Claims, 5 Drawing Sheets

(56) References Cited

U.S. PATENT DOCUMENTS

2015/0309813 A1* 10/2015 Patel .................... G06F 8/75
  703/22
2015/0317234 A1* 11/2015 Ligman ............... G06F 11/3636
  714/38.1
2015/0347282 A1* 12/2015 Wingfors ............ G06F 11/3688
  717/125

OTHER PUBLICATIONS

"Responsive News-Wraith", downloaded from Internet on Mar. 15, 2018, p. 1-8. <http://responsivenews.co.uk/post/56884056177/wraith>.
Applitools, "AI Powered Visual Testing & Monitoring", downloaded from Internet on Mar. 15, 2018, p. 1-9. <https://applitools.com/>.

\* cited by examiner

BUILDING SIGNATURES OF APPLICATION FLOWS

BACKGROUND

Visual application testing is convenient for verifying different functional aspects of desktop and mobile applications. Visual testing can be based on finding visual differences in applications.

DETAILED DESCRIPTION

Application testing can be used to analyze software, such as by determining whether there are issues with a new version of a software application, compared to previous versions. Such testing can be performed visually, comparing visuals between software versions. Various techniques can be used to visually compare two images of an application screen. A pixel-by-pixel comparison between two images, however, can result in false positives that are produced when differences are found, because some visual differences may be unrelated to issues with the software (e.g., if a website contains a promotional banner advertisement with dynamically changing content, the visual comparison will identify changes in the advertisement that are not relevant to identifying issue with the software). When comparing the entire application screen, there is no indication which feature or application flow is affected when certain visual differences are detected. Accordingly, it is difficult to estimate the impact of such detected changes when performing application testing.

To address such issues, examples described herein enable content-aware visual testing to build a visual signature of a test run. A test run of a manual or automated test can be recorded, e.g., by making a video recording of the user interface to extract screenshots, capturing screenshots while the test is running, and so on. Screens (e.g., those of the screenshots that are relevant to the application flow), such as a set of application screens, can be identified from among the captured screenshots. Elements of a given screen can be identified as having been covered by a specific test run, by using gaze data collected by an eye tracking device, or inputs from a mouse, a keyboard, a touch interface, a gesture, voice recognition devices, and so on. Such screens and elements can be combined into a signature to represent a given test run or other execution of an application.

Thus, example implementations described herein can be used for content-aware visual testing, e.g., by performing selective visual comparisons of application screens and application elements as captured by a signature, the screens/elements being relevant for a given test flow or feature/user story associated with that signature. Screens and/or elements that are not relevant (e.g., dynamically updating advertisements) can be ignored, thereby avoiding false positives that would otherwise be triggered by sensing visual differences caused by a changing advertisement banner. A signature can provide rich context for a given test or flow of an application. A subset of relevant elements can be captured by a signature, enabling more efficient handling of both the capturing and the testing of application runs.

Figure 1:
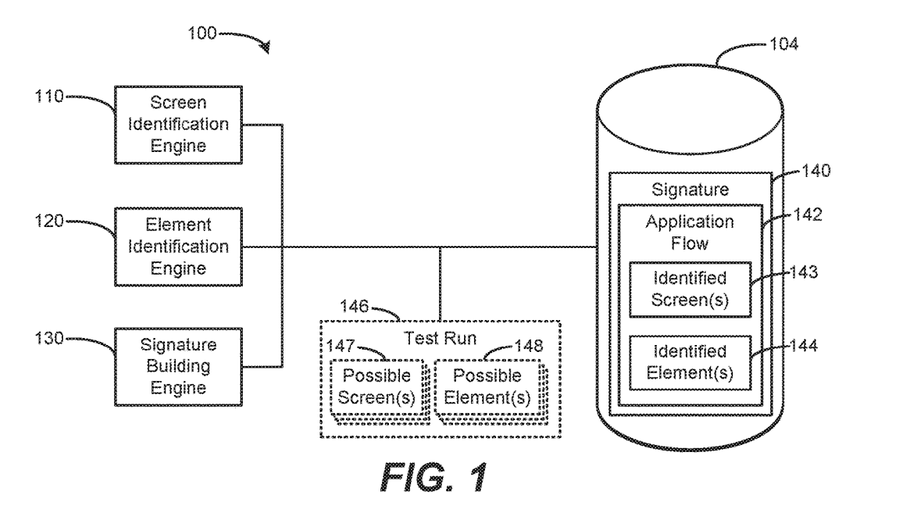
FIG. 1 is a block diagram of a system including a screen identification engine, an element identification engine, and a signature building engine according to an example.

FIG. 1 is a block diagram of a system 100 including a screen identification engine 110, an element identification engine 120, and a signature building engine 130 according to an example. The engines 110-120 are operatively coupled to storage 104, which stores signature 140. The signature 140 is associated with application flow 142, which is based on identified screen(s) 142 and identified element(s) 144. The engines 110-130 are to interact with possible screen(s) 147 and possible element(s) 148 of test run 146.

More specifically, the screen identification engine 110 is to identify at least one screen of possible screens 147 of a test run execution of a test. As used herein, the term test run represents a test execution of a test, as executed on a host system such as a device capable of executing applications. The execution may include actions taken manually by a user, for example, as inputs to the application under test. The execution also may include simulation of user actions performed automatically by a test execution tool. The output from the application under test may be displayed on a screen or display device of the host system on which the test is being executed. The screen identification engine 110 can identify the at least one screen based on image processing analysis of at least one screenshot of the application under test. A video recording can be made of the application under test, and the screen identification engine 110 can extract frames from the video recording. The host system executing the application also can be directed by the screen identification engine 110 to take a screenshot at various intervals. In an example implementation, a screenshot can be taken (or a frame can be extracted from a video) at an interval of 15 milliseconds (ms). The screen identification engine 110 can identify a given screen (for further analysis by the element identification engine 120 as described below) based on a corresponding frame/screenshot that has been taken/recorded. User actions (manual and/or automatic) also are recorded. The action may be an action of user input or responsive to user input or may be an action occurring from operation of the application independent of direct user input.

The element identification engine 120 is to identify at least one element, which corresponds to the test run 146, from among available/possible element(s) 148 of the at least one screen identified by the screen identification engine 110 as set forth above. The element identification engine 120 is to identify the at least one element based on input activity such as user gaze data, input device data, simulated user activity as performed by automated test execution, and so on. The element identification engine 120 can identify all elements of a screen, e.g., using visual processing, and can include those elements that correspond to some action/input. Thus, the element identification engine can include, in the resulting signature, those elements of the given screen that correspond to application flow, without needing to include elements that do not correspond to application flow.

Input activity is relevant for testing. An eye tracking input device, such as a hardware eye tracker device or camera, can be used to collect gaze data. Input activity includes eye movement, gestures, voice, touch, mouse clicks, and so on. Input activity can be performed by a user, and/or simulated programmatically using test automation tools. When performing automated testing, the element identification engine 120 can perform element identification based on simulated user activity as performed by automated test execution.

The signature building engine 130 is to build the signature 140 corresponding to the test run 146, based on incorporating the at least one identified screen 143 and the at least one identified element 144 into the signature 140, to capture in the signature 140 the application flow 142 of the test run 146. A visual signature 140 contains the set of the application screens 143 and the elements 144 for each screen that have been covered by a test run 146 of an application.

Application screens 143 that are identified form part of the application flow 142. The application flow 142 that is captured in the signature 140 can include a sequence of the identified application screens 143 and the identified application element(s) 144 for a respective corresponding screen(s) 143. Thus, a given application screen 143 can appear several times in the application flow 142, but with different elements 144 highlighted/selected, depending on the test execution application flow 142. A given one of such application screen(s) 143, in a sequence of the application flow 142, can be compared to another screen, e.g., by comparing based on a per-element basis (or at a lower granularity, e.g., checking whether a given element from the signature 140 is present).

As used herein, computer-readable media can be provided by storage 104, which may be accessible by the system 100, to serve as a computer-readable repository to store information such as signature 140, application flow 142, screens 143, elements 144, and/or other components/instructions that may be referenced by the engines 110, 120, 130. As described herein, the term "engine" may include electronic circuitry for implementing functionality consistent with disclosed examples. For example, engines 110, 120, and 130 represent combinations of hardware devices (e.g., processor and/or memory) and programming/instructions to implement the functionality consistent with disclosed implementations. In example implementations, the programming for the engines may be processor-executable instructions stored on a non-transitory machine-readable storage media, and the hardware for the engines may include a processing resource to execute those instructions. An example system (e.g., a computing device), such as system 100, may include and/or receive tangible non-transitory computer-readable media storing the set of computer-readable instructions. As used herein, the processor/processing resource may include one or a plurality of processors, such as in a parallel processing system, to execute the processor-executable instructions. The memory can include memory addressable by the processor for execution of computer-readable instructions. The computer-readable media can include volatile and/or non-volatile memory such as a random access memory ("RAM"), magnetic memory such as a hard disk, floppy disk, and/or tape memory, a solid state drive ("SSD"), flash memory, phase change memory, and so on.

In some examples, the functionality of engines 110, 120, 130 may correspond to operations performed in response to, e.g., information from storage 104, activity/interaction as received by the, e.g., engines 110, 120, 130, and so on. The storage 104 may be accessible by the system 100 as a computer-readable storage media, in which to store items in a format that may be accessible by the engines 110, 120, 130.

Regarding operation of the system 100, information can be captured to build a signature(s), e.g., based on captured screenshots and activity/interaction with an application. In an example, a test application run can involve a user selecting something in the running application, and the application can change in response to the selecting. The system 100 can track, based on timestamps, activities and output of the application that is displayed, e.g., by capturing a precise timestamp of a mouse click based on events of the application/browser, as well as a precise timestamp of when a given screenshot of the application was taken. The screen identification engine 110 can detect/identify an application screen from among such captured screenshots using various techniques, such as using various image comparisons to identify whether a change between screenshots has occurred, and whether such a change is significant due to its being related to application flow 142. In an example, the screen identification engine 110 can find those screenshots that visually depict new information, and choose such screenshots as identified application screens 143 to be included in a signature 140. Similarly, the element identification engine 120 can find those elements of an identified screen 143 that are significant based on activity interaction with those elements (e.g., user gazing at the element, mouse click/touches on that element, etc.), and choose such identified elements 144 to be included in the signature 140.

Accordingly, the signature 140 can exclude many of the possible screen(s) 147 and/or possible element(s) 148 from a given test run 146 of an application, by selectively identifying and choosing those screens 143 and elements 144 relevant to application flow 142 to be included in the signature 140. Because possible elements 148 to exclude can include dynamically changing content (e.g., advertisements), the signature 140 is not cluttered by possible elements 148 that might lead to false positives in identifying changes between test runs and their corresponding signatures 140.

The identified elements 144 can be generated from user actions, and the identified screens 143 from visually displayed information, such that the resulting signature 140 is technology agnostic. Accordingly, the example implementations described herein may be implemented on many different types of devices, having different screen resolutions, types of input, and so on. Resulting signatures 140 from application runs on different types of devices (e.g., a laptop and a smartphone) can be compared with each other without risk of false positive differences being identified, e.g., for signatures 140 obtained from test runs 146 whose placement of various elements in relative positions on the screen is similar between devices (e.g., an element in the middle position of the screen on a 16:9 laptop display will be in the same relative middle position of the screen on a 16:9 tablet display). Activity/input, such as mouse clicks/touches, can be associated with coordinates on a given screen, and can be checked whether the coordinates align with a given element of the screen. When comparing the signatures (e.g., by a comparison engine), certain deviations in the coordinates can be allowed, e.g., using a pre-defined threshold. Accordingly, if two elements belonging to different signatures are close enough or similar in size (i.e., not exactly equal, but within the threshold), the elements still can be considered to be a match.

The signature 140 includes application screen(s) 143, which can visually highlight the element(s) 144 selected from the test run 146 to represent the application flow 142. The signature 140 can be used for comparisons, e.g., compared against a previous test run 146 (which could be used as a baseline for comparisons). In other example implementations, a collection of signatures 140 can be compared with each other, to identify whether a given signature 140 deviates from the others (e.g., representing an anomaly with that test run corresponding to that deviating signature 140). In addition to being used for comparisons, a signature 140 can be used to provide other benefits, such as guiding a user according to a desired application flow represented by the signature 140, indicating whether a test run missed anything or otherwise deviates from a desired application flow 142 captured by the signature 140 (displaying feedback in real-time), and so on. For example, while a user is performing a live test, a manual test engine can guide the user through the test, and display instructions or other helpful information to assist the user as to the next action that should be taken in the test run 146. Such comparisons and other benefits enable smart/efficient uses, because a subset of possible screens/elements 147, 148 (e.g., relevant to a specific test run of an application) can be identified for inclusion in the signature 140, reducing overhead that might otherwise be needed for storing/comparing/using the signature 140.

Figure 2:
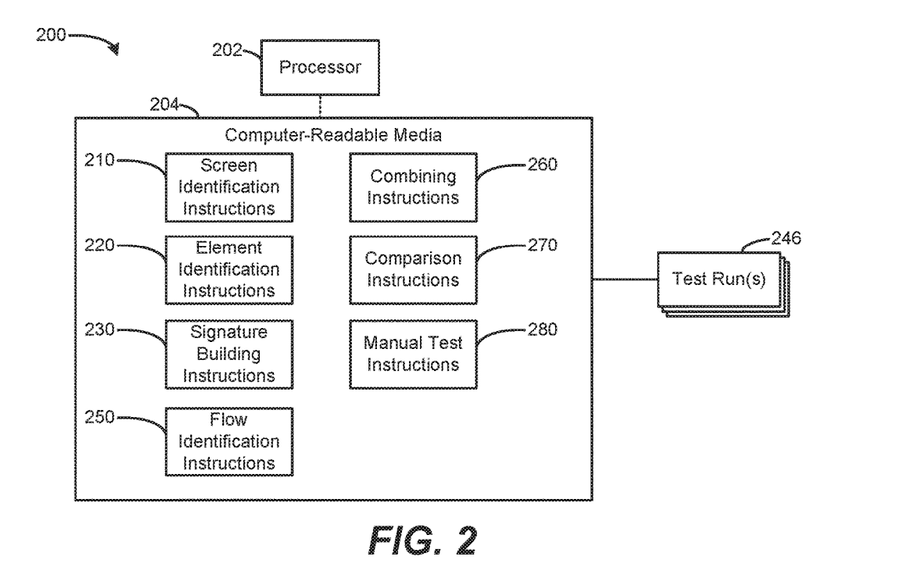
FIG. 2 is a block diagram of a system including screen identification instructions, element identification instructions, signature building instructions, flow identification instructions, combining instructions, comparison instructions, and manual test instructions according to an example.

Various approaches can be used to perform a comparison (e.g., based on a comparison engine according to comparison instructions 270 shown in FIG. 2). As described above, screens (of a given signature 140, or from different signatures 140) can be compared using graphical image processing techniques, and elements can be compared based on their screen coordinates or other identifying information (including their associated interactive element, such as a text box, icon, or other component, such as those of a website). In an example comparison approach between two signatures 140, each element 144 of each application screen 143 of each application flow 142 of the first signature 140 can be compared to its respective counterpart in the second signature 140. The sequence of the application screens 143 can be compared, as well as the sequence/location of their elements 144. In an example implementation, a heat map representation of the elements 144 can be compared between given signatures 140. Unlike a brute force approach based on a comparison of the entire screen 143, comparisons can be efficiently carried out by comparing that content (identified elements 144) relevant to a given specific test run application flow 142, while excluding from the comparison other possible elements 148 that are not included in the signature 140.

A collection of test runs 146 can be represented by a respective collection of signatures 140. In other example implementations, a combining engine can create an aggregated/combined signature representing multiple test run recordings. Thus, a given test run can be repeated using different inputs with given iterations, and the combining engine can aggregate the identified screens 143 and/or elements 144 into the aggregate visual signature 140 for that test. Thus, the aggregate visual signature 140 can capture the various different application flow 142 paths through a different test execution(s), corresponding to the different inputs used to follow the different paths. Such aggregate signatures are helpful in representing applications where no single test run can capture all possible paths through the application, and where multiple runs are needed to use different inputs in each run to navigate through all potential paths.

The test run 146 can be performed manually by a user, or can be performed automatically by using an automated test application (e.g., applications available for user interface testing) to automatically provide input activity such as button clicking, while a screen identification engine 110 captures screenshots of possible screens 147 during the automated test run 146.

When the visual signature 140 has been captured/built, it can be used in several ways. A test run 146 can represent a specific flow or feature of a given application, containing a subset of features of the application flow 142 as represented by the identified screens and/or elements 143, 144. The visual signature 140 accordingly captures the context of a specific application flow 142 and/or corresponding feature or user story. Thus, if a given captured signature 140 does not match a baseline signature representing a desired application flow 142, it is possible to identify many aspects of what may have gone wrong. Accordingly, the signature 140 can reveal that there is an issue with a specific application screen 143 and/or element 144, and also that the test run 146 has failed and provide linkage to a specific application feature, user story, or application flow associated with the identified issue. Such usage of signatures 140 can be valuable for regression testing, where it is common practice to compare new versions of an application to previous versions.

Automatic verification can be performed using a given signature 140, e.g., by comparing the signatures of a given test run 146 with the signature 140 of other test runs 146. For example, to automate visual verification for regression testing, an exemplary test run 146 can be chosen as the baseline, to which subsequent test runs 146 of the same application test can be verified against automatically, by comparing the signature 140 corresponding to the current test run 146, to the signature 140 corresponding to the baseline test run 146. A baseline test run 146, and its corresponding signature 140, can be chosen using various approaches, and can depend on the type of process/application being tested. In an example implementation, a previous test run 146 can be used as the baseline to compare the current test run 146. A plurality of test runs 146 can be compared to each other, and an aggregate result can be used as the baseline.

A visual signature 140 can be used to guide a tester who is not familiar yet with the application flow (e.g., because it is a new tester, and/or because it is a new application flow). While the tester is performing a test, a comparison engine can make a comparison between the current/live application screen seen by the tester, and the captured screens 143 of the visual signature 140 that has been generated by another (e.g., baseline) run of the same test. The comparison will identify which live elements on the application screen seen by the tester are relevant to the test application flow that the tester is performing, and the identifying results will be displayed on the screen for the tester (e.g., displayed as additional information, as an overlay, etc.). The signature 140 selectively includes the identified screens/elements 143, 144 that are relevant to the desired application flow 142, while excluding possible screens/elements 147, 148 that are not relevant to the desired application flow 142. Accordingly, items displayed to the tester to assist in manual testing can be provided in the context of the screen the tester is currently on during the live test run 146. For each given screen 143 of the test run 146, those relevant elements 144 to be tested/covered can be highlighted. For example, if a tester should go to screen A, and perform an action on element X, the screen A and the element X can be captured by a baseline visual signature 140 to be displayed to the tester for visual comparison. In other words, the tester can look for elements that form part of the given signature 140 representative of a desired application flow 142 to be tested by the tester. Because such guidance can be provided by a manual test engine "live" while the tester is running the test, screenshots can be taken during the test run 146.

Signatures 140 of a test run 146 can be used to warn that certain parts of a manual test or an automated test have not been covered, by comparing the signature 140 of the current test run 146 with the signature 140 of another test run 146 of the same application being tested. In the case of automated testing, the test coverage can differ if the test execution depends on varying input activity/data, or if the code of the test has been changed between test runs 146. Regardless, differences in the visual signatures 140 will point to potential testing coverage problems, compared to previous/baseline/aggregate test run(s) 146 and their corresponding signature(s) 140.

By using example signatures 140 and comparing a subset of possible elements 148 of possible screens 147 captured by those signatures 140, examples described herein can narrow down the results to those elements 144 that are relevant for a specific test run 146 or functional application flow 142, thereby eliminating potential false positives that might occur due to other elements that are not related to a desired test or flow. Furthermore, comparisons using example signatures 140 can provide indications of visual regression in the context of specific application flows 142, features, and/or user stories, rather than broadly referencing an entire application or application screen. Such focused and specific results can be used to estimate the impact on particular end users, based on which specific features are implicated and which particular users are affected by those features.

Thus, example implementations described herein enable various benefits. Selective comparison of a subset of elements associated with a given signature may decrease false positives. The introduction of new features may not affect the stability of the existing tests of the previous, unchanged features, even if the changes are introduced on the same application screen. The context of the test flow or feature/user story may provide a way to estimate the impact of the visual regressions on real users. Guided testing provided by use of the specifically identified screens/elements may enable helpful visual verifications and guidance.

FIG. 2 is a block diagram of a system 200 including screen identification instructions 210, element identification instructions 220, signature building instructions 230, flow identification instructions 250, combining instructions 260, comparison instructions 270, and manual test instructions 280 according to an example. The computer-readable media 204 is associated with a processor 202 and test run(s) 246.

The instructions 210, 220, 230 may correspond respectively to the engines 110, 120, 130 included in the computing system 100 of FIG. 1. The instructions 250, 260, 270, 280 may correspond to engines (not specifically shown in FIG. 1) that also may be included in the computing system 100 of FIG. 1. The computing system 200 of FIG. 2 includes a processor 202 and computer-readable media 204, associated with the instructions 210-280, and which may interact with test runs 246. Operations performed when instructions 210-230 are executed by processor 202 may correspond to the functionality of engines 110-130. Thus, in FIG. 2, the operations performed when screen identification instructions 210 are executed by processor 202 may correspond to functionality of screen identification engine 110 (FIG. 1). Similarly, the operations performed when element identification instructions 220 and signature building instructions 230 are executed by processor 202 may correspond, respectively, to functionality of element identification engine 120 and signature building engine 130 (FIG. 1). Operations performed when flow identification instructions 250, combining instructions 260, comparison instructions 270, and manual test instructions 280 are executed by processor 202 may correspond to functionality of respective flow identification engine, combining engine, comparison engine, and manual test engine (not specifically shown in FIG. 1, but whose functionality is set forth above with respect to operation of system 100 of FIG. 1).

As set forth above with respect to FIG. 1, engines may include combinations of hardware and programming. Such components may be implemented in a number of fashions, including the use of the elements shown in FIG. 2. For example, the programming may be processor-executable instructions stored on tangible, non-transitory computer-readable media 204 and the hardware may include processor 202 for executing those instructions 210-280. Processor 202 may, for example, include one or multiple processors. Such multiple processors may be integrated in a single device or distributed across devices. Media 204 may store program instructions, that when executed by processor 202, implement system 100 of FIG. 1. Media 204 may be integrated in the same device as processor 202, or it may be separate and accessible to that device and processor 202.

In some examples, program instructions can be part of an installation package that when installed can be executed by processor 202 to implement system 100. In this case, media 204 may be a portable media such as a CD, DVD, flash drive, or a memory maintained by a server from which the installation package can be downloaded and installed. In another example, the program instructions may be part of an application or applications already installed. Here, media 204 can include integrated memory such as a hard drive, solid state drive, or the like. While in FIG. 2, media 204 includes instructions 210-280, instructions may be located remotely from media 204. Conversely, although FIG. 2 illustrates interaction with test runs 246 located separate from media 204, information from the test runs 246 may be included with media 204.

The computer-readable media 204 may provide volatile storage, e.g., random access memory for execution of instructions. The computer-readable media 204 also may provide non-volatile storage, e.g., hard disk or solid state disk for storage. Components of FIG. 2 may be stored in any type of computer-readable media, whether volatile or non-volatile. Content stored on media 204 may include images, text, executable files, scripts, or other content that may be used by examples as set forth below. For example, media 204 may contain configuration information or other information that may be used by engines 110-130 and/or instructions 210-280 to provide control or other information.

As for the instructions 210-230, such screen identification, element identification, and signature building operations are set forth above regarding the descriptions of engines 110-130.

The flow identification instructions 250 are to identify the application flow 142 of a test run 146, based on a sequence of the at least one screen 143, and the at least one element 144 corresponding to a given respective one of the screens 143, as captured by the signature 140. For example, the application flow 142 can be identified as a sequence of a first screen, a text entry box element on the first screen, a second screen, and a button click on the second screen.

The combining instructions 260 can combine a plurality of signatures 140, obtained from a plurality of corresponding test runs 146, into a combined signature 140 including a superset of the at least one screen 143 and the at least one element 144 from the combined plurality of signatures 140. The combining instructions 260 also can combine elements 144, representing different application flow 142 paths through a given test run 146, into the combined signature 140. For example, the visual signatures 140 of the multiple tests runs 146 can be combined into one visual signature 140 by creating a superset of the application screens 143 and the elements 144 of the visual signatures 140 of the separate test runs 146. If, for example, there is a test run that has different paths depending on the input activity/data that is used in each specific test run 146, the visual signatures 140 of each test path can be combined into one visual signature 140 by including all application screens 143 and all elements 144 covered by the test runs 146.

The comparison instructions 280 can compare a test signature 149 from a test run 146 with at least one other signature 140 from at least one other test run 146. This allows the comparison instructions 270 to identify deviations between the test signature 140 and the at least one other signature 140. For example, the comparison instructions 270 can compare the signature 140 to a baseline signature 140 corresponding to a baseline test run 146. The comparison instructions 270 can check a subset of possible elements 148 (i.e., the set of identified elements 144) from the test run 146, which have been captured by the test signature 140, and exclude uncaptured elements from the test run 146 that are not associated with the test signature 140.

The comparison instructions 270 enable many-to-many comparisons. For example, separate test executions can be run for various operating systems, and the resulting signatures 140 from all test runs 146 can be compared to each other. In this case, no baseline signature 140 is designated, and the comparison instructions 270 compare all signatures 140 to each other to determine whether any of the signatures 140 deviates from the majority of the other signatures 140. An example use case for such a many-to-many comparison is in performing cross-device or cross-browser testing, in the expectation that the same test run will generate the same visual signature 140. Thus, an example system can compare the signatures 140 of the test run as performed on various different web browsers. If the signature 140 corresponding to the test run using a particular one of the web browsers is different from the other signatures, there is potential problem with the implementation of the application being tested for that particular web browser.

The manual test instructions 280 are to display at least one element 144, during a current test run 146 in the context of the current screen 143, to prompt a user. The elements 144 to be so displayed can be chosen, by a manual test engine according to the manual test instructions 280, from a sample signature 140 to correspond to progress through the current test run 146. The manual test instructions 280 are to further highlight which element(s) 144 on the given displayed screen 143 of the test run 146 are relevant to the test application flow 142 being performed, e.g., by displaying a live overlay while performing the test run 146. The manual test instructions 280 also can provide a warning, during a test run 146, that at least a portion of the test run 146 is not being covered, by comparing the visual signature 140 of the present test run 146 with a sample signature 140 corresponding to a sample test run 146.

Figure 3:
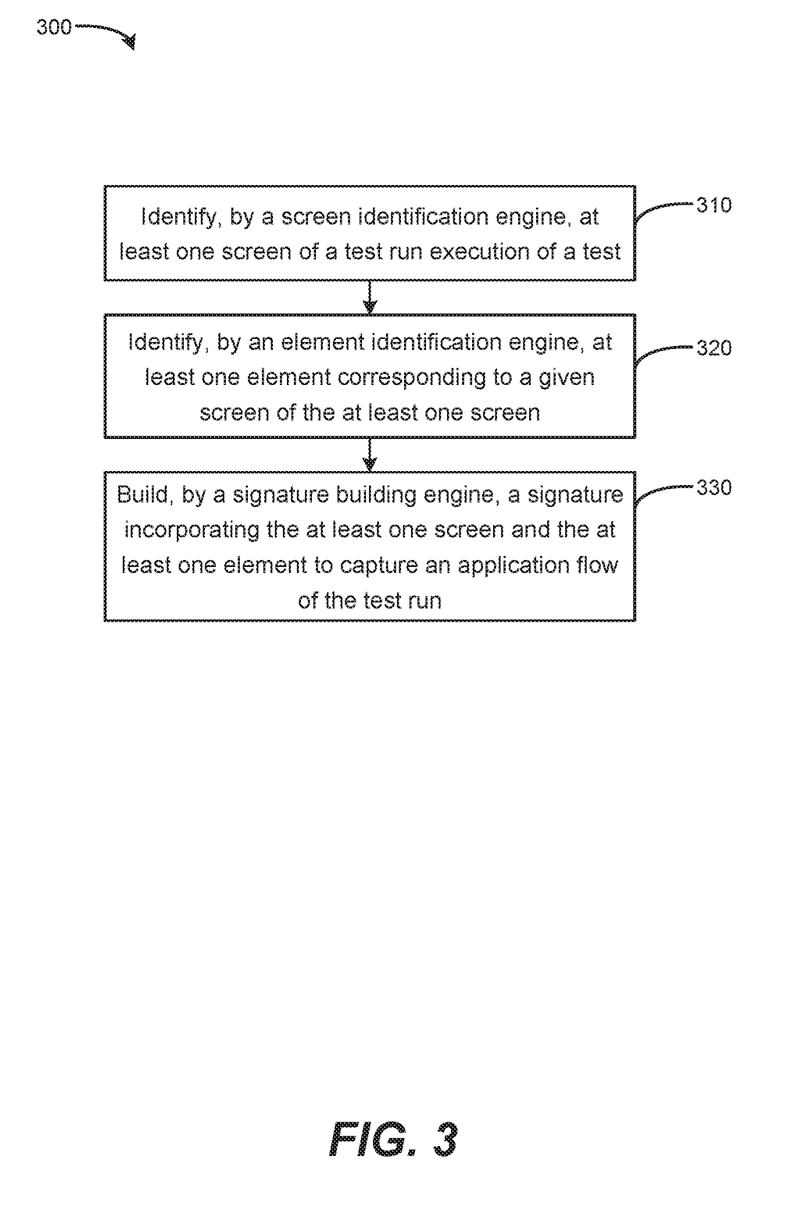
FIG. 3 is a flow chart of an example process for identifying at least one screen, identifying at least one element, and building a signature.
Figure 4:
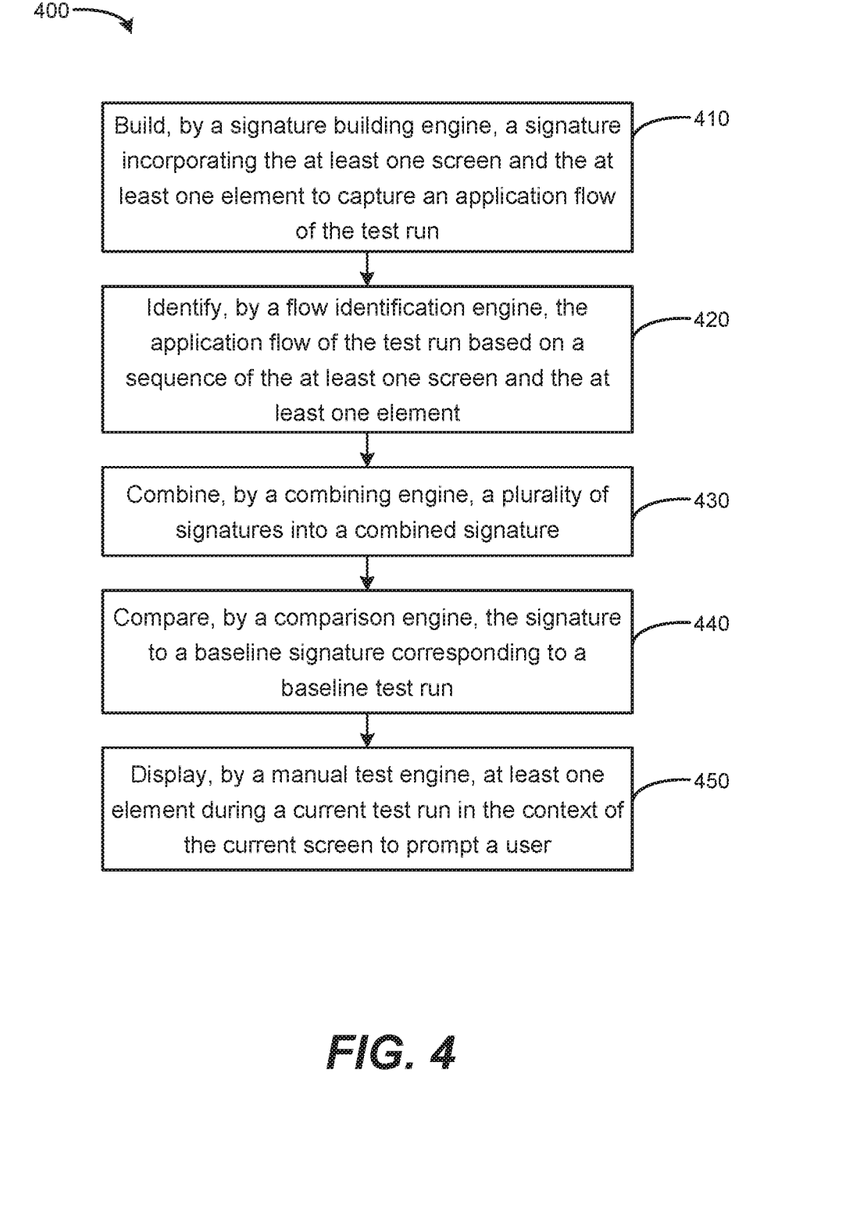
FIG. 4 is a flow chart of an example process for building a signature, identifying the application flow, combining a plurality of signatures, comparing signatures, and displaying elements to prompt a user.

Referring to FIGS. 3 and 4, flow diagrams are illustrated in accordance with various examples of the present disclosure. The flow diagrams represent processes that may be utilized in conjunction with various systems and devices as discussed with reference to the preceding figures. While illustrated in a particular order, the disclosure is not intended to be so limited. Rather, it is expressly contemplated that various processes may occur in different orders and/or simultaneously with other processes than those illustrated.

FIG. 3 is a flow chart 300 of an example process for identifying at least one screen, identifying at least one element, and building a signature. In block 310, a screen identification engine is to identify at least one screen of a test run execution of a test. For example, the screen identification engine can capture a screenshot of the presently displayed application undergoing a test run, in response to receiving user activity input, such as a mouse click. In block 320, an element identification engine is to identify at least one element corresponding to a given screen of the at least one screen. For example, the element identification engine can identify what underlying element of a webpage corresponds to the coordinates of the mouse click (such as a text entry box), and identify which of the identified screens the element corresponds to, by matching a timestamp of the mouse click activity with the nearest timestamp of a screen. It is possible that the timestamps match. However, the timestamp of the mouse click (or other input activity) can fall between nearest timestamps of adjacent screens, in which case the element identification engine can choose from among the screens having appropriate timestamps based on whether an element corresponds to the screen coordinates of the input activity (e.g., identify the screen having a timestamp within the window of opportunity and having an element located at the screen coordinates for the input activity). In block 330, a signature building engine is to build a signature incorporating the at least one screen and the at least one element to capture an application flow of the test run. For example, the signature building engine can exclude many potentially irrelevant screens and their elements, by incorporating those screens containing at least one element that was interacted with during the test run, and is therefore involved in the application flow.

FIG. 4 is a flow chart 400 of an example process for building a signature, identifying the application flow, combining a plurality of signatures, comparing signatures, and displaying elements to prompt a user. In block 410, a signature building engine is to build a signature incorporating the at least one screen and the at least one element to capture an application flow of the test run. For example, the techniques set forth above with respect to FIG. 3 can be performed to generate the signature. In block 420, a flow identification engine is to identify the application flow of the test run based on a sequence of the at least one screen and the at least one element. For example, a first screen can be associated with a first series of elements, followed by a second screen associated with a second series of elements. Such screens/elements can represent a test run through a given flow path of an application, where a user clicked on the first series of elements on the first screen, and then proceeded to a click on a second series of elements of the second screen. Such activity can be captured in a signature for that test run. In block 430, a combining engine is to combine a plurality of signatures into a combined signature. For example, the test run described above for block 420 can be one of several possible paths in a run through of a given application, as captured by a first signature. Subsequent test runs can be used to explore other possible paths of other run throughs of the application, to generate multiple subsequent signatures. These multiple signatures can be combined together to provide a broad perspective of the application, via a combined signature. Such a combined signature can still exclude various other possible screens/elements, if those are not relevant to a given application flow/path. In block 440, a comparison engine is to compare the signature to a baseline signature corresponding to a baseline test run. For example, a tester can attempt to test several aspects of a given application, interacting with various screens/elements during the test, which are captured as a test signature for that tester. However, it is possible to determine if the tester missed any testing, by comparing whether the testers test signature includes the relevant screen(s) and/or element(s) that are included in the baseline signature corresponding to a baseline test run. In block 450, a manual test engine is to display at least one element during a current test run in the context of the current screen to prompt a user. For example, the manual test engine can identify that the tester is on a screen containing three clickable buttons. The tester may click on one of the buttons as desired, but fail to click on one of the remaining buttons. The manual test engine can check a baseline signature to see that one button remains to be clicked for the present screen, and overlay a "click here" or similar message on the present display, to prompt/instruct the tester to click the appropriate button (which corresponds to a remaining element to be satisfied in order to coincide with those screens/elements contained in the baseline signature used for guiding/prompting testers).

Figure 5:
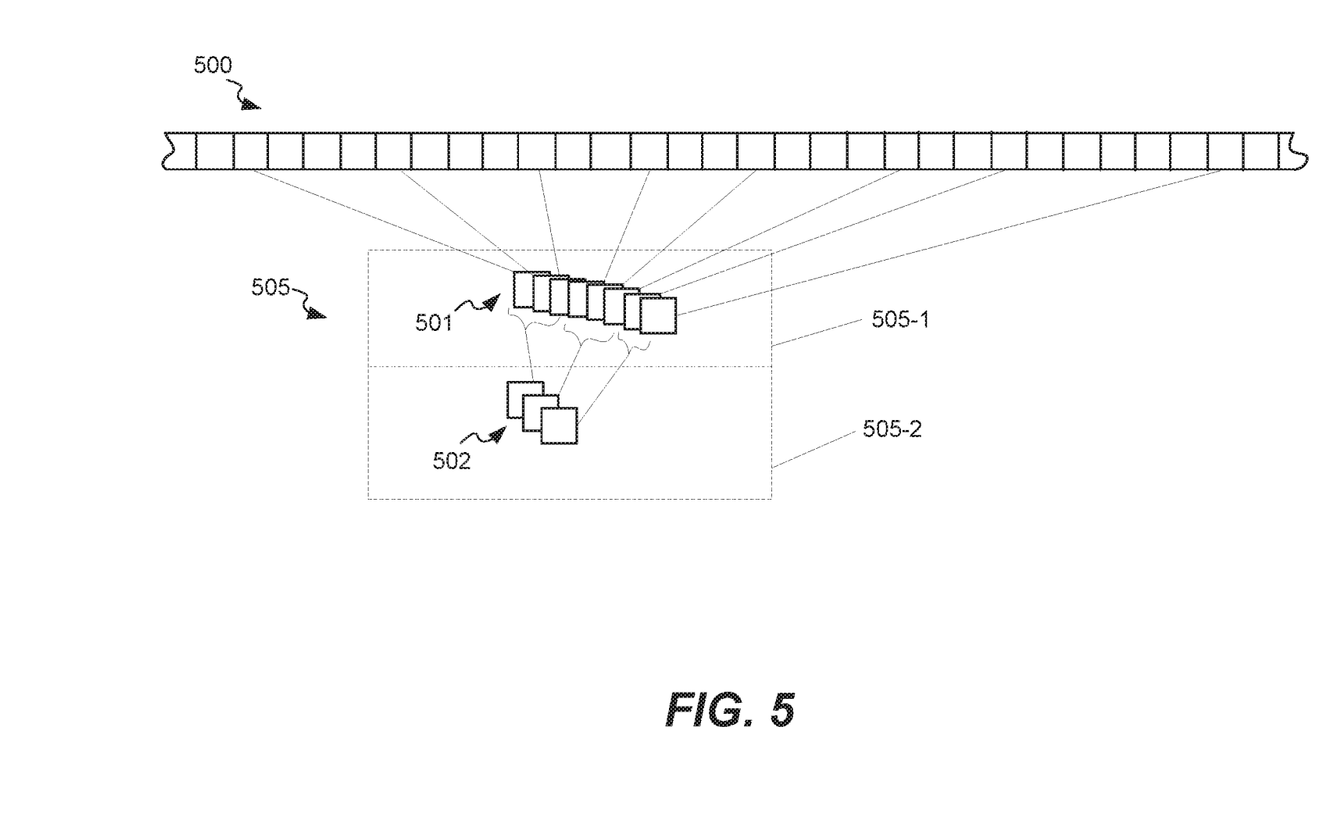
FIG. 5 is a diagram illustrating a technique to generate application flow screens according to an example.

FIG. 5 is a diagram illustrating a technique to generate application flow screens 505 from available screenshots 500 according to an example. A screen identification engine, as set forth above with respect to FIG. 1, can access a stream or series of image frames 500 from a test execution of an application. This series of frames 500 may be video of the display device showing output from the application under test or a series of screenshots taken by the host device on which the application test is conducted.

Some of these image frames are identified as being "significant," meaning that they document an action occurring in the test of the application, such as user input, an application response to user input, or a development in the application's own process shown in the visual output of the application. The subset of frames may be identified by comparing each frame to a previous frame in the series. This may be done by determining a degree of change between compared images from the series of image frames; and when the degree of change exceeds a threshold, adding a corresponding frame to the subset of image frames. For example, in the digital data, this visual change would be indicated by the pixels representing the addition of a cursor, used by a tester to provide input/clicks, changing to indicate the presence of the cursor. This visual change signals to the system that an image frame is "significant" because it records an activity/action occurring, in this case, the user invoking a cursor to change a value of an element. The significant image frames are collected as a first subset 501.

Frames can be grouped into subsets according to whether they correspond to a given underlying application screen. For example, by comparing frames of the subset to each other to determine a difference between each pair of frames; and, when the difference between a pair of frames is below a threshold, assigning that pair of frames as corresponding to a same application screen. To further reduce the size of the data stored in a given signature, the method may include representing an application screen with a last significant frame in the series that corresponds to that application screen. From each such group, a representative image frame may be taken to form a second subset 502. For example, the last-in-time frame from each group may be taken as the representative frame for that group to be included in the second subset 502. Frames are associated with timestamps for determining their order of occurrence.

An application flow entity 505 is generated based on the subsets of frames. The application flow entity 505 may be generated in several different ways depending on the needs and preferences of the application developer. For example, the application flow entity 505 may include both the first and second subsets of frames 501 and 502, along with or without other information about the test execution of the application. In another example, an application flow entity 505-2 may include the second subset of frames 502, with or without other information about the corresponding test execution of the application. This application flow entity 505-2 would have a small size and small demands on storage and processing resources. Lastly, the application flow entity 505-1 may include the first subset of significant frames, with or without other information about the corresponding test execution of the application. Such frames can be collected, along with information such as relevant elements of each of the frames, as a signature as described above.

Figure 6:
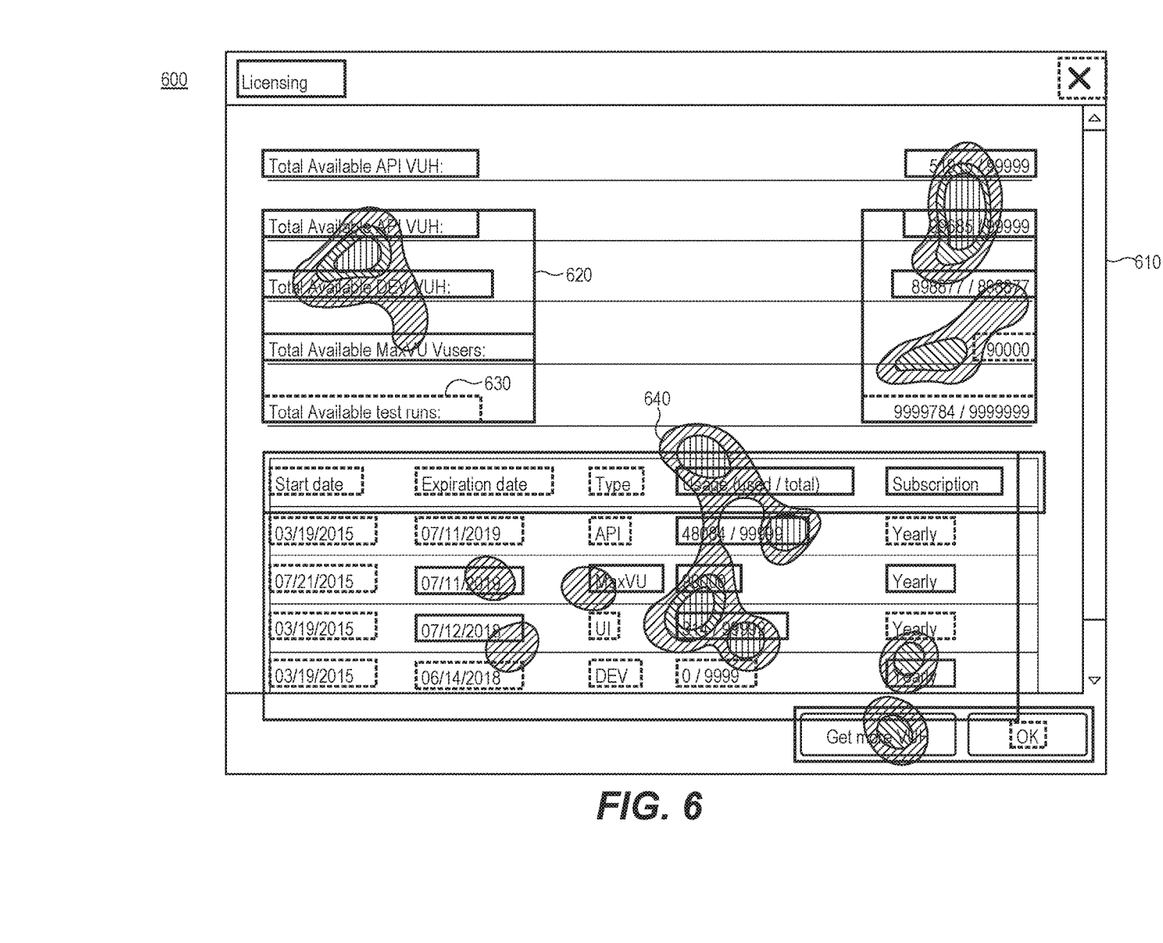
FIG. 6 is a diagram illustrating visual testing coverage to identify application flow elements of a screen according to an example.

FIG. 6 is a diagram illustrating visual testing coverage to identify application flow elements of a screen according to an example. The visual testing coverage 600 may display visual testing coverage(s) of a set of specific tests (e.g., a single test, tests by a particular user, tests from a number of users, tests from a particular geographic location, etc.). In some implementations, a visual testing coverage report may show a set of principal application screens, with a visualization of the visual testing coverage of each of the set of principal application screens being superimposed on an image of the corresponding principal application screen. For example, the visual testing coverage report shown in FIG. 6 may include an image of a principal application screen 610, and a visualization of which user interface (UI) element(s)/element areas are covered (one of which, UI element area 620 has been labelled for clarity) and are not covered (one of which, UI element area 630 has been labelled for clarity). The visualization of which UI element areas are covered may take many forms, such as different colors and/or shapes surrounding the UI element areas. In the example illustrated in FIG. 6, the UI elements that are considered covered are shown in rectangles with solid lines, while the UI elements that are considered not covered are shown in rectangles with dashed lines. As another example, green rectangles may indicate that a particular UI element area is covered, while red rectangles that may indicate that a particular UI element area is not covered. As another example, gaze data heat maps (one of which, heat map 640, has been labelled for clarity) may be overlaid on the principal application screen to visualize the specific gaze data associated with that screen. However, any suitable visualization of the visual testing coverage and/or gaze data may be used.

In some implementations, the test execution activity/data may include gaze data, input device data, automation data, or a combination of the gaze data, the input device data, and the automation data. Thus, elements considered as being covered (as shown in solid lines) represent some activity/interaction, such as being the focus of eye tracking data, or being indicated by a red mouse symbol representing a user clicking the mouse there, or other actions performed by a tester such as touch interaction. In an example implementation, during manual tests, a testing coverage device may capture gaze data using a gaze capture device, and may capture input device data using an input device. Similarly, during automated tests, the testing coverage device may cause a client device to capture automation data from, for example, computing devices executing the automated tests.

The testing coverage device may cause the storage of the captured data, such as the gaze data, the input device data, and the automation data in a repository, such as storage 104 of system 100 shown in FIG. 1.

Gaze point coordinates of the test execution data and coordinates of the UI elements can be used by an element identification engine to determine whether a particular UI element is covered visually. In some implementations, gaze points in the gaze data can be mapped to UI element areas on the principal application screens. For example, the gaze points in the gaze data can be mapped by determining the coordinates that define the boundaries of the UI element areas, and determining whether the coordinates of the gaze points fall within the boundaries of the UI element areas. In some implementations, the mapped gaze points may be limited to gaze points that are fixated (e.g., a state during which the eye remained still over a period of time, rather than quick eye movement from one fixation point to another). For example, gaze data may include fixation data captured by a gaze capture device, the gaze data can be parsed to identify the fixated gaze points. By mapping fixated gaze points, visual testing coverage can be more accurately identified. For example, if a tester wants to interact with a menu element of a given screen, there may be a number of gaze points around that element because the tester's eye may need to identify that there is an element, look at the mouse to ensure the tester is making the right selection, and so on. By mapping fixated gaze points, potential gaze points that do not play a significant role in the visual verification can be excluded from resulting signatures (and can be excluded from being used to identify candidate elements of a given screen).

Example engines provided herein may be implemented in hardware, software, or a combination of both. Example systems can include a processor and memory resources for executing instructions stored in a tangible non-transitory medium (e.g., volatile memory, non-volatile memory, and/or computer readable media). Non-transitory computer-readable medium can be tangible and have computer-readable instructions stored thereon that are executable by a processor to implement examples according to the present disclosure.

An example system (e.g., including a controller and/or processor of a computing device) can include and/or receive a tangible non-transitory computer-readable medium storing a set of computer-readable instructions (e.g., software, firmware, etc.) to execute the methods described above and below in the claims. For example, a system can execute instructions to direct a signature building engine to generate a signature capturing identified screen(s) and identified element(s), wherein the engine(s) include any combination of hardware and/or software to execute the instructions described herein. As used herein; the processor can include one or a plurality of processors such as in a parallel processing system. The memory can include memory addressable by the processor for execution of computer readable instructions. The computer readable medium can include volatile and/or non-volatile memory such as a random access memory ("RAM"), magnetic memory such as a hard disk, floppy disk, and/or tape memory, a solid state drive ("SSD"), flash memory, phase change memory, and so on.

What is claimed is:

1. A computing system comprising:
    a processor; and
    a memory storing instructions executable to cause the processor to:
        identify at least one screen of a test run of a test for an application;
        identify at least one element in the at least one screen of the test run of the test for the application that corresponds to an application flow of the test run of the test for the application while excluding other elements in the at least one screen of the test run of the test for the application that do not correspond to the application flow of the test run of the test for the application, wherein the at least one element in the at least one screen of the test run of the test for the application is selectively identified from among available elements in the at least one screen of the test run of the test for the application;
        build a test signature of the test run of the test for the application by incorporating the at least one screen of the test run of the test for the application and the at least one element in the at least one screen of the test run of the test for the application into the test signature of the test run of the test for the application to capture the application flow of the test run of the test for the application;
        combine a plurality of test signatures, obtained from a plurality of corresponding test runs of the test for the application, into a combined plurality of test signatures;
        compare the test signature of the test run of the test for the application to another test signature of another test run of the test for the application; and
        display deviations between the test signature of the test run of the test for the application and the other test signature of the other test run of the test for the application to prompt a user based on the comparison.

2. The computing system of claim 1, wherein the instructions are to cause the processor to identify the at least one screen of the test run of the test for the application based on image processing analysis of at least one screenshot of an application under test.

3. The computing system of claim 2, wherein the instructions are to cause the processor to identify the at least one screen of the test run of the test for the application from at least one screenshot obtained at intervals from live capture of the test run of the test for the application or from recorded video of the test run of the test for the application.

4. The computing system of claim 1, wherein the instructions are to cause the processor to identify the at least one element in the at least one screen of the test run of the test for the application based on user gaze data input activity.

5. The computing system of claim 1, wherein the instructions are to cause the processor to identify the at least one element in the at least one screen of the test run of the test for the application based on input device data input activity.

6. The computing system of claim 1, wherein the instructions are to cause the processor to identify the at least one element in the at least one screen of the test run of the test for the application based on simulated user input activity as performed by an automated test execution.

7. The computing system of claim 1, wherein the instructions are to cause the processor to infer that activity occurred between captured screens based on a timestamp of input activity failing between prior and subsequent captured screens, and to identify the at least one element in the at least one screen of the test run of the test for the application based on changes between the prior and subsequent captured screens.

8. The computing system of claim 1, wherein the instructions are to cause the processor to identify the application flow of the test run of the test for the application based on a sequence of the at least one screen of the test run of the test for the application, and the at least one element in the at least one screen of the test run of the test for the application corresponding to a given respective one of the at least one screen of the test run of the test for the application, as captured by the test signature of the test run of the test for the application.

9. The computing system of claim 1, wherein the combined plurality of test signatures includes a superset of the at least one screen of the test run of the test for the application and the at least one element in the at least one screen of the test run of the test for the application from the combined plurality of test signatures.

10. The computing system of claim 9, wherein the instructions are to cause the processor to combine elements, representing different flow paths through a given test, into the combined plurality of test signatures.

11. The computing system of claim 1, wherein the other test signature of the other test run of the test for the application is a baseline test signature corresponding to a baseline test run of the test for the application.

12. The computing system of claim 1, wherein the instructions are to cause the processor to check a subset of possible elements from the test run of the test for the application, which have been captured by the test signature of the test run of the test for the application, and to exclude uncaptured elements from the test run of the test for the application that are not associated with the test signature of the test run of the test for the application.

13. The computing system of claim 1, wherein a given test signature is to represent features of the application corresponding to the at least one screen of the test run of the test for the application and the at least one element in the at least one screen of the test run of the test for the application, and to accommodate additions of new features without negatively affecting representation of already existing features.

14. The computing system of claim 1, wherein the instructions are to cause the processor to display at least one element, during a current test run of the test for the application in the context of a current screen of the test run of the test for the application, to prompt the user, and wherein the displayed at least one element is chosen from a sample test signature to correspond to progress through the current test run of the test for the application.

15. The computing system of claim 14, wherein the instructions are to cause the processor to highlight which elements on the current screen of the test run of the test for the application are relevant to the application flow of the test run of the test for the application being performed by displaying a live overlay while running the test.

16. The computing system of claim 14, wherein the instructions are to cause the processor to provide a warning, during a test run of the test for the application, that at least a portion of the test run of the test for the application is not being covered, by comparing a visual test signature of the current test run of the test for the application with a sample test signature corresponding to a sample test run of the test for the application.

17. A method comprising:
identifying, by a processor of a computing device, at least one screen of a test run of a test for an application;
identifying, by the processor of the computing device, at least one element in the at least one screen of the test run of the test for the application that corresponds to an application flow of the test run of the test for the application while excluding other elements in the at least one screen of the test run of the test for the application that do not correspond to the application flow of the test run of the test for the application, wherein the at least one element in the at least one screen of the test run of the test for the application is selectively identified from among available elements in the at least one screen of the test run of the test for the application;
building, by the processor of the computing device, a test signature of the test run of the test for the application by incorporating the at least one screen of the test run of the test for the application and the at least one element in the at least one screen of the test run of the test for the application into the test signature of the test run of the test for the application to capture the application flow of the test run of the test for the application;
combining, by the processor of the computing device, a plurality of test signatures, obtained from a plurality of corresponding test runs of the test for the application, into a combined plurality of test signatures;
comparing, by the processor of the computing device, the test signature of the test run of the test for the application to another test signature of another test run of the test for the application; and
displaying, by the processor of the computing device, deviations between the test signature of the test run of the test for the application and the other test signature of the other test run of the test for the application to prompt a user based on the comparison.

18. The method of claim 17, wherein the other test signature of the other test run of the test for the application is a baseline test signature corresponding to a baseline test run of the test for the application.

19. A non-transitory machine-readable storage medium encoded with instructions executable by a computing system that, when executed, cause the computing system to:
identify at least one screen of a test run of a test for an application;
identify at least one element in the at least one screen of the test run of the test for the application that corresponds to an application flow of the test run of the test for the application while excluding other elements in the at least one screen of the test run of the test for the application that do not correspond to the application flow of the test run of the test for the application, wherein the at least one element in the at least one screen of the test run of the test for the application is selectively identified from among available elements in the at least one screen of the test run of the test for the application;
build a test signature of the test run of the test for the application by incorporating the at least one screen of the test run of the test for the application and the at least one element in the at least one screen of the test run of the test for the application into the test signature of the test run of the test for the application to capture the application flow of the test run of the test for the application;
combine a plurality of test signatures, obtained from a plurality of corresponding test runs of the test for the application, into a combined plurality of test signatures;
compare the test signature of the test run of the test for the application to at least one other test signature of at least one other test run of the test for the application to establish a baseline application flow; and display deviations between the application flow of the test run of the test for the application and the baseline application flow to prompt a user based on the comparison.

20. The non-transitory machine-readable storage medium of claim 19, wherein the computing system is to determine the baseline application flow based on comparing multiple test signatures of a given test run of the test for the application, to identify the test signature of the test run of the test for the application as being different from a plurality of other test signatures, and to use the application flow of the test run of the test for the application consistent with the plurality of other test signatures.

* * * * *